United States Patent [19]
Busse

[11] 3,964,948
[45] June 22, 1976

[54] METHOD FOR DOSING A LOCKING AGENT INTO A THREADED HOLE

[75] Inventor: Walter Busse, Neubiberg, Germany

[73] Assignee: Maschinenfabrik Augsburg-Nurnberg AG, Munich, Germany

[22] Filed: Nov. 25, 1974

[21] Appl. No.: 526,761

[30] Foreign Application Priority Data
Dec. 1, 1973   Germany............................ 2359937

[52] U.S. Cl.................................... 156/91; 29/458; 403/288; 156/295
[51] Int. Cl.²............................................. B32B 7/04
[58] Field of Search.................. 29/460, 422, 527.1, 29/527.2, 458, 526, DIG. 34; 264/4, 229, 219, 239, 241, 248, 249, 261, 263, 267, 268, 279; 403/40, 265, 269, 288; 61/45 B; 156/295

[56] References Cited
UNITED STATES PATENTS

| | | | |
|---|---|---|---|
| 2,666,354 | 1/1954 | Dim et al. ............... | 29/DIG. 34 UX |
| 3,006,671 | 10/1961 | Opocensky .................... | 151/14.5 X |
| 3,140,967 | 7/1964 | Kaufman et al. ...................... | 156/91 |
| 3,146,142 | 8/1964 | Maly................................. | 29/458 UX |
| 3,164,560 | 1/1965 | Suter................................... | 206/84 X |
| 3,189,227 | 6/1965 | Hobbs et al...................... | 222/107 X |
| 3,298,144 | 1/1967 | Fischer............................ | 61/45 B X |
| 3,339,003 | 8/1967 | Cessna............................ | 403/267 X |
| 3,430,449 | 3/1969 | Novotny et al..................... | 61/45 B |
| 3,485,132 | 12/1969 | Hanny et al............................ | 85/1 C |
| 3,517,954 | 6/1970 | Snyder et al...................... | 29/460 X |
| 3,550,270 | 12/1970 | Watson et al...................... | 29/458 X |
| 3,639,137 | 2/1972 | Marinelli............................ | 85/1 C X |
| 3,731,791 | 5/1973 | Fourcade et al. ............... | 61/45 B X |

Primary Examiner—Charlie T. Moon
Attorney, Agent, or Firm—Alan H. Levine

[57] ABSTRACT

A dose of a liquid or semi-liquid locking agent is enclosed within a hollow wall to form a capsule. The capsule is introduced into a threaded blind hole, after which a screw is threaded into the hole. Movement of the screw into the hole crushes the capsule to release the locking agent. The collapsed capsule wall fills the space between the inner end of the screw and the bottom of the blind hole, and the locking agent is forced into the helical space between the screw threads and the hole threads.

1 Claim, 1 Drawing Figure

U.S. Patent June 22, 1976 3,964,948
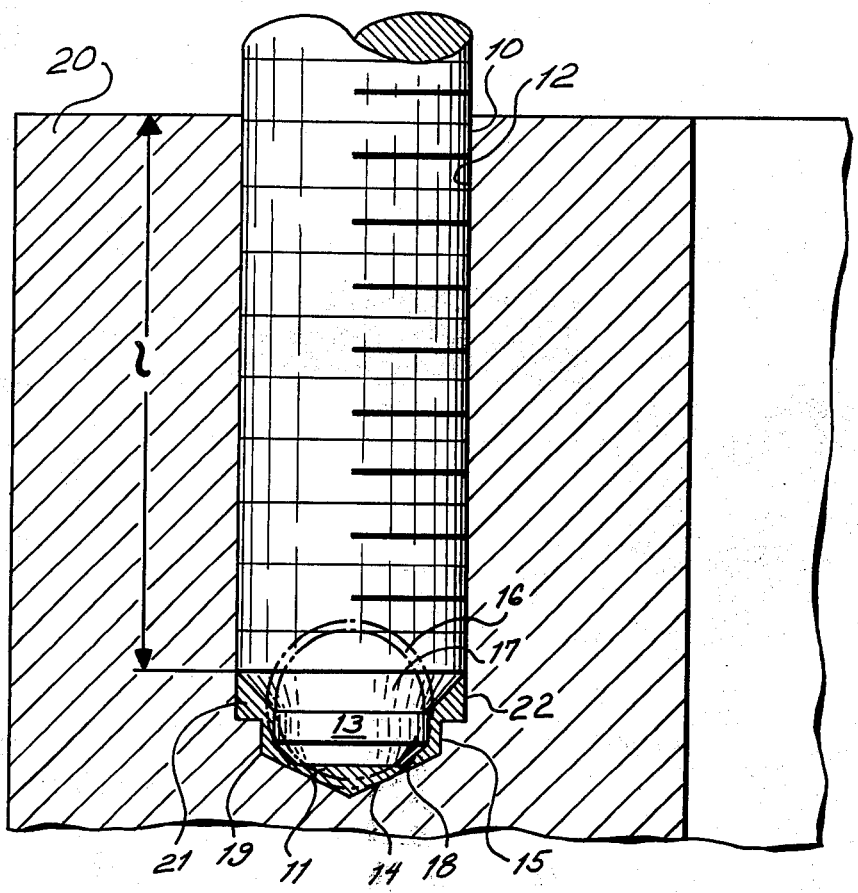

METHOD FOR DOSING A LOCKING AGENT INTO A THREADED HOLE

The present invention relates to a dosing means for a liquid or paste-like agent which serves to lock a bolt into a threaded blind hole. For this purpose the locking agent is introduced, within a hollow body defining a capsule, into the blind hole and the hollow body is crushed in the region of the bottom of the blind hole by the screwing in of the bolt, the locking agent released being forced into the thread clearance where it hardens.

The locking agent is, in particular, of the type capable of hardening in the thread clearance without reduction in volume, thereby jamming itself into the regions between the peaks and valleys of the threads and thereby creating a tight form-locked and force-locked connection. The invention concerns, for example, solvent-free single-component plastics of the type which consist essentially of a polyacryl ester and are known in particular under the trade names "Loctite," or adhesives, for example, IS-Zyanacrylate, or thermosetting resins. Faster hardening is frequently obtained if the threads are of metal.

As compared with smearing the screw, and/or the hole threads with the liquid or paste-like locking agent before the screw has been inserted, it is advantageous to use the capsule of this invention, because it makes it possible to accurately dose and thereby reduce the amount of the locking agent used, while the amount is frequently much greater than necessary when the above-mentioned smearing method is employed. The increased consumption is particularly undesirable in the case of mass production. Conventional dosing devices, on the other hand, have well known disadvantages.

The object of the present invention is to reduce the amount of the locking agent needed in any particular screw and blind hole combination. In order to achieve this result, the invention provides a capsule having a wall which, in the end position of the bolt, entirely or approximately entirely collapses and completely or approximately completely fills up the remaining residual space between the inner end of the bolt and the bottom portion of the blind hole.

The end position of the bolt may be an axial position of the bolt in which the end of the bolt touches or does not touch the bottom of the blind hole. The aforementioned remaining filled residual space of the blind hole can consist, depending on the content of the capsule wall, the bolt end position, and the said dimensions, of a single space or of several parts. An end surface of the bolt which also serves to form the residual space of the blind hole can, for example, be convex.

By means of the invention, the result is obtained that all of the locking agent or approximately all of the locking agent contained in the capsule is forced out of the end of the blind hole into the thread clearance. Thus it is necessary to introduce into the end of the blind hole only that quantity of locking agent which is subsequently to fill the thread clearance, preferably over its entire length; the corresponding saving of locking agent is particularly important in the case of mass production. In this way, the hollow space within the capsule which is almost completely filled with the locking agent, its residual space being preferably filled with air, need only be as large or approximately as large as the capacity of the thread clearance. Thus the capsule, which may have the same wall thickness throughout, can be made relatively small so that, even though compact, it can still be introduced into the blind hole with a relatively large quantity of locking agent, such as is needed where there is a relatively large radial play between the screw and hole threads. Furthermore, no part or practically no part of the wall of the capsule is pressed into the thread clearance in accordance with the invention.

Particularly in those cases in which, when not too large a volume of the capsule wall is desired, and changes in given dimensions of the bolt end and/or of the end of the blind hole are to be effected only slightly or not at all, the volume of a filling agent to be introduced, in addition to the capsule wall, into the blind hole can be so selected that the wall of the hollow body and the filling agent can when entirely or approximately entirely collapsed, fully or approxmately fully fill up the remaining residual space of the blind hole when the bolt is in its end position. This filling agent can, for example, be a solid sphere or a hollow sphere containing no locking agent.

The capsule is of compact shape and preferably spherical shape. In this way it can roll into the blind hole, which may be desirable, particularly for mass production. The capsule can, for example, also be of ellipsoidal shape or the like. The capsule wall may be formed of plastic, preferably organic plastic. The material of the capsule wall may be soft or hard gelatin, or paper; the paper may be impregnated. The filling agent mentioned may also consist of such materials.

One embodiment of the invention is shown in the drawing by way of example. It is the case of an M 10 grub screw in a threaded blind hole in an end of a cylindrical housing seen in longitudinal section on an enlarged scale.

This longitudinal section is taken along the cylindrical axis of the housing 20. The axis is not shown, but is located far to the right of the housing portion shown and extends parallel to the threaded blind hole. A plurality of such threaded blind holes is provided (only one being shown) around the cylinder axis and a lid is screwed to the housing 20 by cooperating grub screws.

The threaded blind hole has an end which is determined by a thread run-out chamfer 22, a coaxial cylindrical wall 15 of the same diameter as the blind-hole thread root diameter, and a coaxial 120° inner cone 14 open towards the blind-hole opening. The grub screw end shown consists of a coaxial transitional frustum 17 and a cylindrical coaxial end extension 13, which has a cylindrical part of smaller diameter than the diameter of the cylindrical wall 15 and terminates with an end frustum having an annular edge 18. In the end, or operative, position of the grub screw its thread 12 and the blind-hole thread 10 engage with each other over an axial length 1, a helical thread clearance being formed between them over this length. The housing 20 and the blind hole thread 10 consist of light metal, such as aluminum, and the grub screw and its thread 12 consist, for example, of steel, and the length 1 is about 2.5 times as large as the outside diameter of the blind-hole thread 10. In the end position of the screw, the end extension 13 extends into the blind-hole base space formed by the cylindrical wall 15 and the inner cone 14.

The volume of the wall of a capsule 16, shown in dashed lines, and the end or operative position of the screw are so selected that with the shapes and dimensions of the grub-screw end and the blind-hole end shown, the hollow spherical capsule wall when approximately fully collapsed substantially entirely fills up the remaining residual space of the blind hole in the end or operative position of the screw and therefore in this end or operative position the volumes of the wall and of the remaining residual space of the blind hole are approximately the same. In accordance with the drawing, the hollow capsule 16 which is practically completely filled with a quantity of a screw-locking liquid, approximately equal to the amount necessary to fill up the entire thread clearance, is introduced into the blind hole at the inner core 14. The grub screw is shown in its end or operative position. In this position the annular edge 18 is at an axial distance from the inner cone 14 which is smaller than the wall thickness of the hollow capsule 16. The radial distance of the cylindrical part of the end extension 13 from the cylindrical wall 15 is approximately equal to the capsule wall thickness. The end or operative position was reached by the grub screw after the hollow capsule 16 collapsed. This collapse was effected by the movement of the end of the grub screw in the final phase of its being screwed into the hole, and results in forcing the entire quantity of liquid released, by the axial direction of screwing, into approximately all of the threaded clearance and simultaneous approximately complete collapse of the entire wall of the hollow spherical capsule to fill the residual space of the blind hole remaining when the grub screw is in its end position. The collapsed wall of the capsule is shown in cross-wise hatching. The residual space of the blind hole approximately entirely filled by it consists of an inner conical space 11 and annular spaces 19 and 21.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A method of introducing a dose of a liquid or semi-liquid locking agent into the helical space between the threads of a screw and a threaded blind hole accommodating the screw, comprising the steps of:
   a. providing a capsule of compact shape comprising the locking agent completely enclosed in a hollow wall,
   b. inserting the capsule into the bottom of the blind hole with the major portion of the capsule volume beneath the lowest point of engagement of the screw and hole threads after the screw has been threaded all the way into the blind hole, and
   c. threading the screw into the hole so that the screw crushes the capsule against the bottom of the hole and releases the locking agent into the helical space between the screw and hole wall during the final portion of the movement of the screw into the hole, the crushed capsule wall material approximately filling the space between the inner end of the screw and the bottom of the hole after the screw has been threaded all the way into the hole.

* * * * *